Oct. 15, 1963 J. M. HOOD 3,106,895
MIXERS
Filed Aug. 5, 1959 5 Sheets-Sheet 3
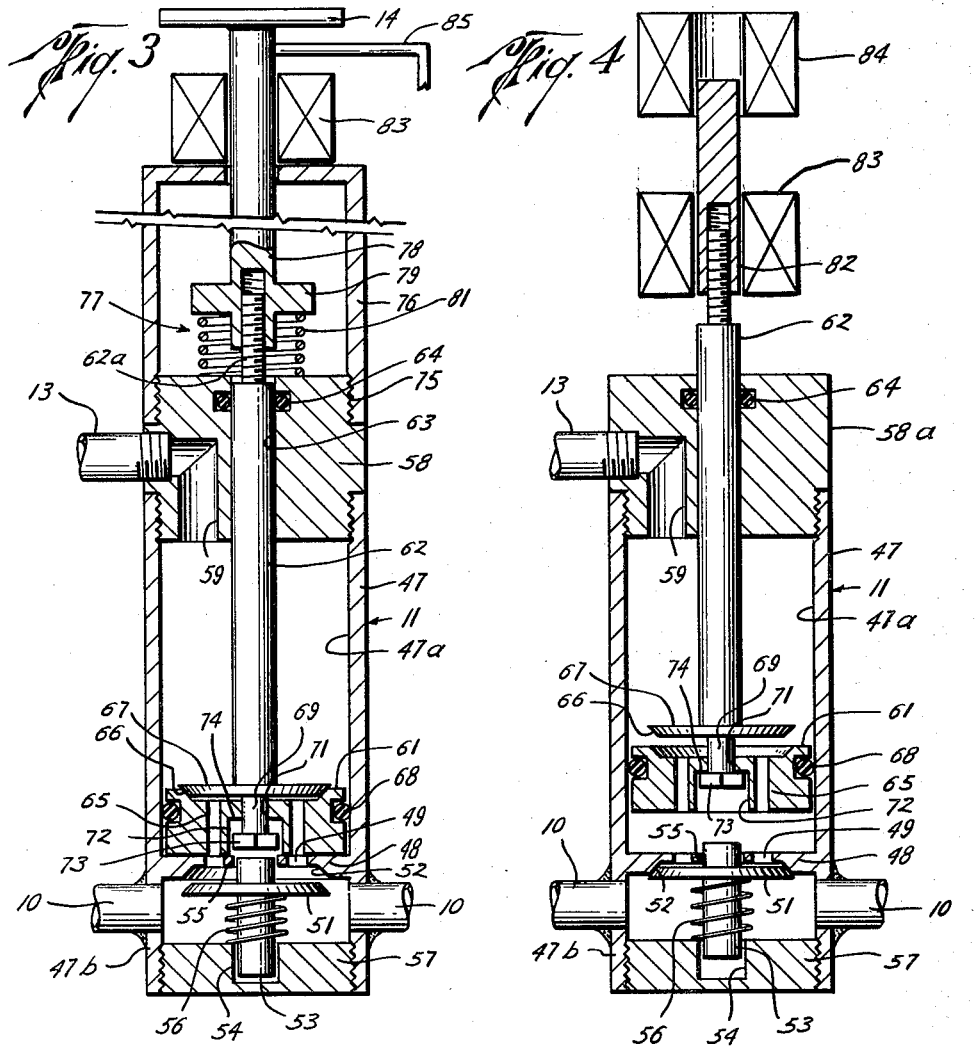
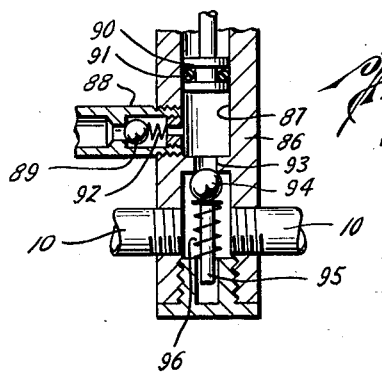
James M. Hood
INVENTOR.
BY
Browning Simmons Hyer
ATTORNEYS

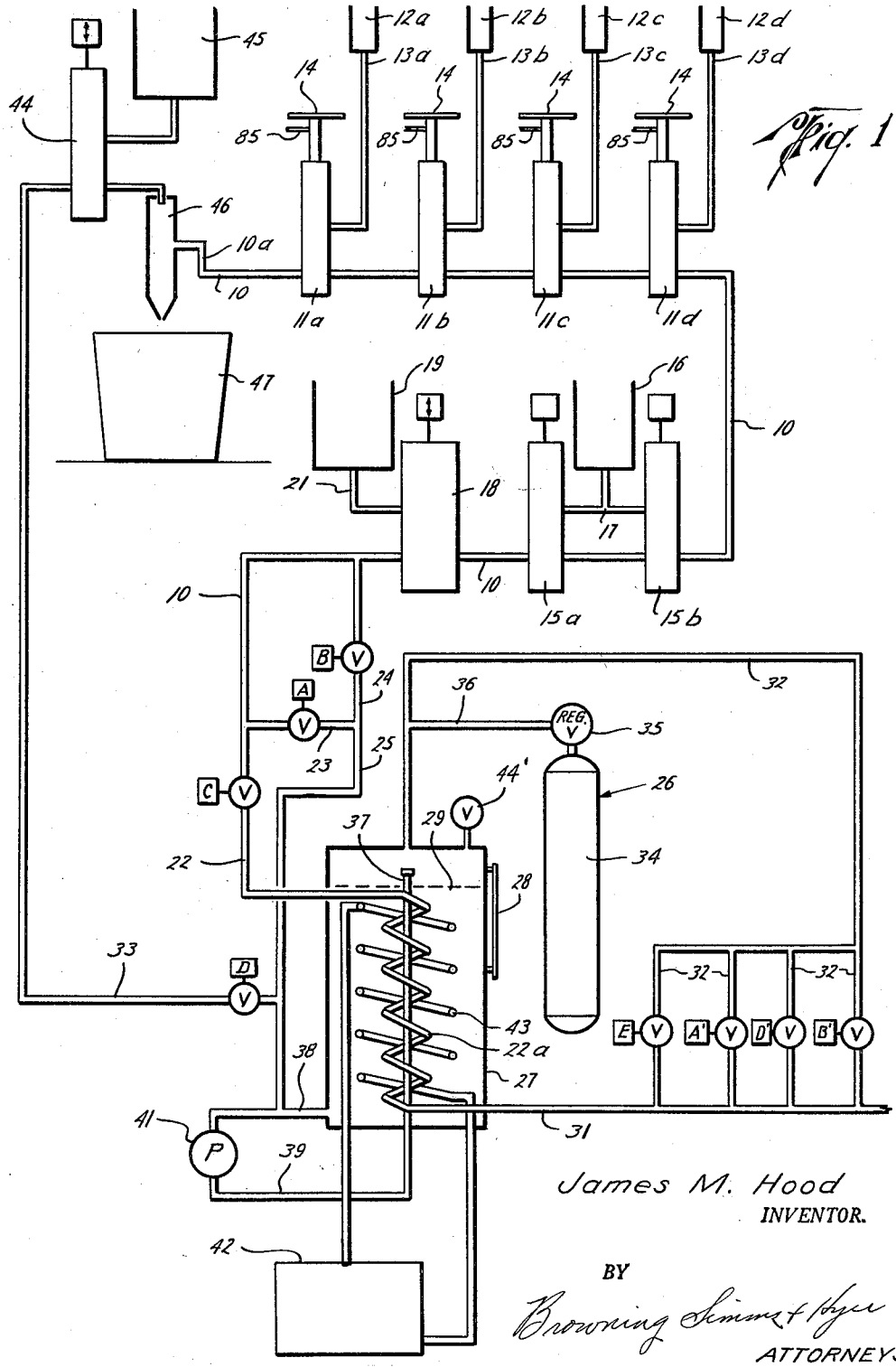

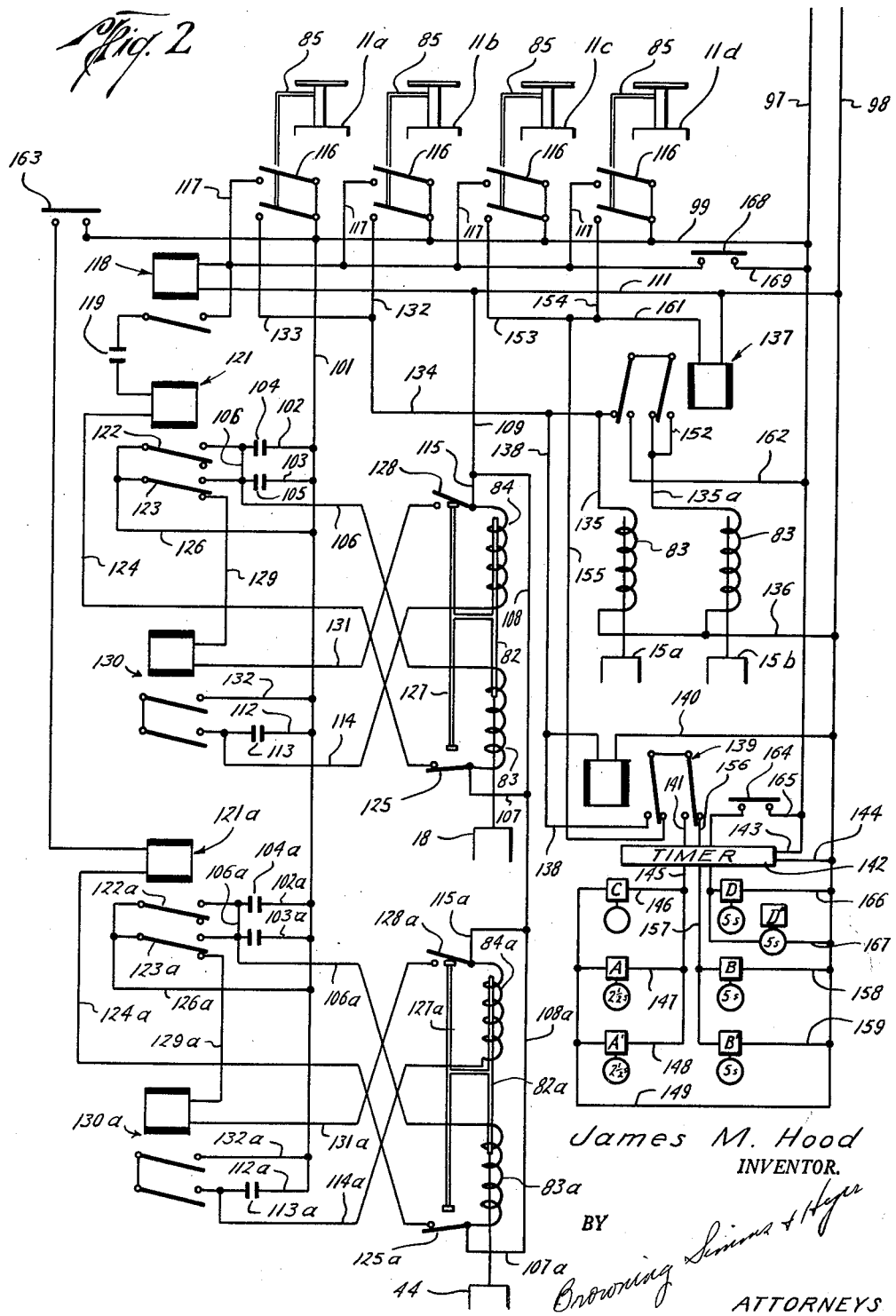

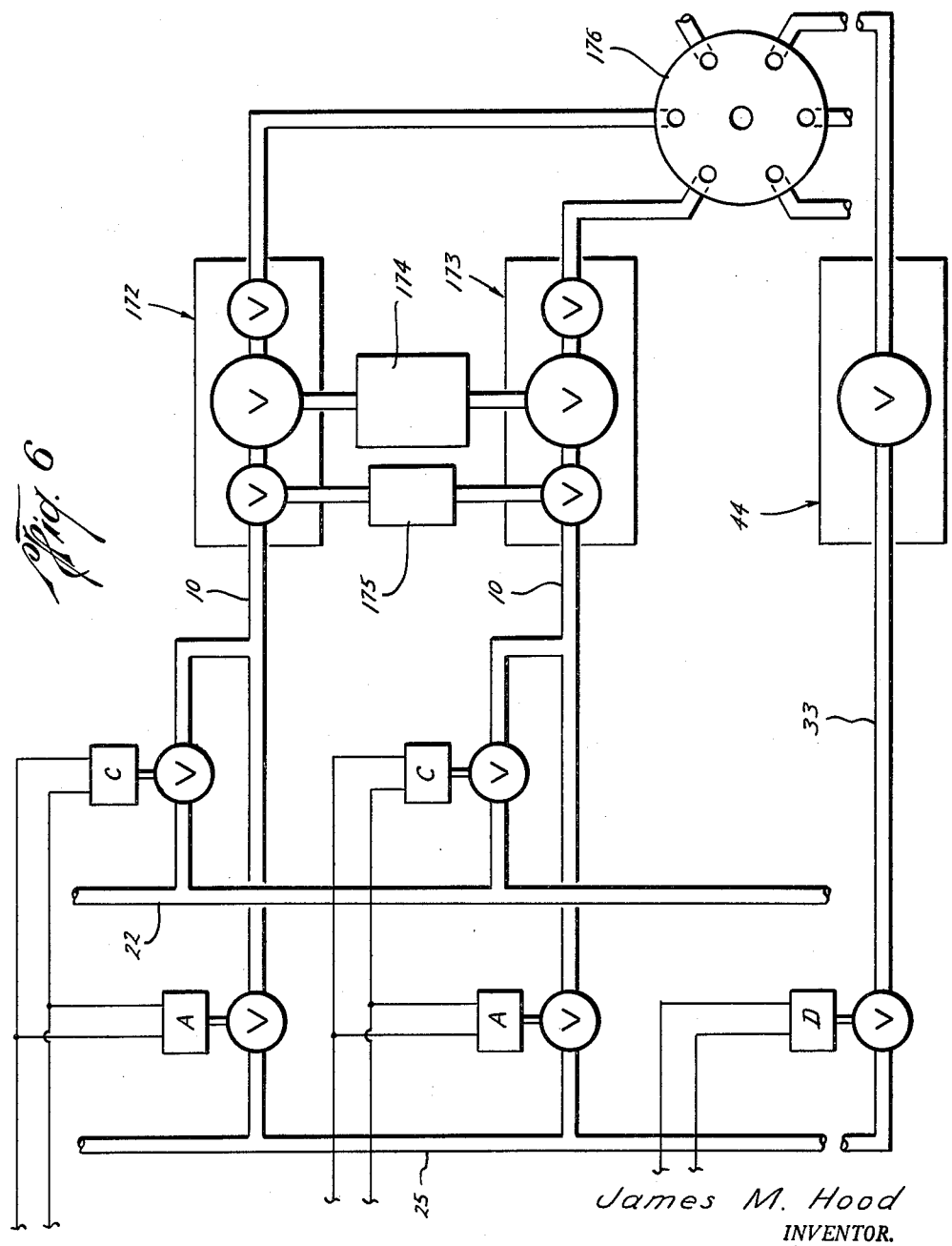

James M. Hood
INVENTOR.

BY
Browning Simms & Hyer
ATTORNEYS

United States Patent Office 3,106,895
Patented Oct. 15, 1963

3,106,895
MIXERS
James M. Hood, 1903 6th St., Palmetto, Fla.
Filed Aug. 5, 1959, Ser. No. 832,884
6 Claims. (Cl. 103—38)

This invention relates to mixers and more particularly to an apparatus for mixing liquids such as soft drinks in which a plurality of different flavored drinks are mixed and dispensed by a single compact machine.

While the mixer of this invention may be used to formulate perfumes, medicines, rocket fuels, and other mixtures involving ingredients in liquid form, it is particularly useful as a soft drink mixer. Therefore, for the purposes of this specification the mixer will be described with particular reference to soft drink mixing.

Soft drinks are presently dispensed by a variety of types of automatic machines. These machines mix flavored sugar syrup and water to dispense a drink.

Flavored syrup is more expensive than flavor in concentrated form and simple sugar syrup which may be mixed together to provide the desired flavor for a drink. It is therefore the primary object of this invention to provide a drink dispensing machine which utilizes simple syrup, and flavor in concentrated form to dispense drinks.

Another object is to provide a drink mixing machine in which a single source of simple syrup may be used in combination with a plurality of sources of flavor concentrate and mixed with carbonated water to dispense drinks of different flavor.

Another object is to provide a mixing machine in which a single source of one liquid may be used in combination with a plurality of sources of different liquids and mixed with a third liquid to mix different solutions.

Another object is to provide a compact drink mixer for preparing a plurality of flavors.

Another object is to provide a compact drink mixer for preparing a plurality of flavors in which a minimum number of metering pumps may be used.

Another object is to provide a compact drink mixer for preparing a plurality of flavors in which actuation of the machine automatically introduces the necessary ingredients for the drink into a mixing conduit and replenishes the source of carbonated water with water and carbon dioxide as it is used.

Another object is to provide an electrically operated drink mixer for preparing a plurality of flavors in which a minimum number of electric motors are used.

Another object is to provide a carbonator in which the volume of water and the degree of carbonation is maintained substantially constant with intermittent withdrawal of carbonated water.

Another object is to provide a drink mixer in which both carbonated and plain water are chilled and always ready for drink mixing.

Another object is to provide a carbonator which utilizes a single source of carbonated water and which selectively provides water at different degrees of carbonation.

Another object is to provide a carbonator which delivers carbonated water from a single vessel and automatically replenishes the carbonated water as it is withdrawn from the vessel with an equal volume of plain water.

Another object is to provide a metering pump which is simple and economical in construction and will dependably meter measured amounts of liquid a few drops or a few ounces at a time.

Another object is to provide a metering pump as in the preceding object which will introduce liquid directly into a drink mixing conduit so that all of the metered liquid will be washed into the drink by the mixing water.

Other objects, features and advantages of this invention will be apparent from the specification, the attached drawings and the appended claims.

In the drawings, wherein there is shown illustrative embodiments of this invention:

FIG. 1 is a schematic layout of a drink mixer constructed in accordance with this invention;

FIG. 2 is an electrical diagram illustrating a preferred form of circuit for operating the drink mixer of FIG. 1;

FIG. 3 is a view in vertical cross section through a metering pump which is used to introduce both flavor concentrate and acid into the metering line of the system of FIG. 1;

FIG. 4 is a view in vertical cross section through a pump which is identical in form with the pump of FIG. 3 with the exception of the mechanism for reciprocating the actuator rod and which is much larger in size and is used to meter simple syrup and Coca-Cola syrup;

FIG. 5 is a view in vertical cross section through a pump which may be used in place of the pump of FIGS. 3 and 4;

FIG. 6 is a schematic layout of another form of drink mixing apparatus; and

Figure 7:
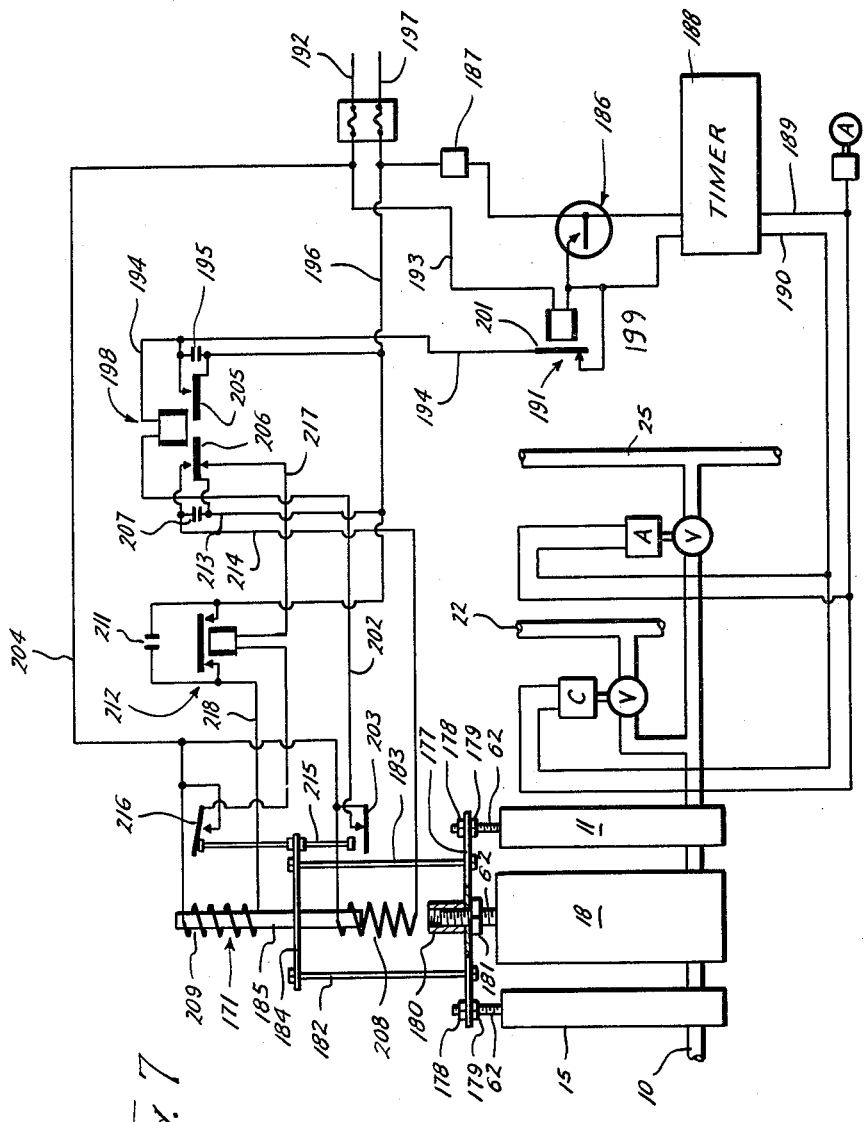
FIG. 7 is a further schematic layout of the system of FIG. 6 together with an electrical circuit for operating the system of FIGS. 6 and 7.

The drink mixing system of FIG. 1 comprises generally a dispensing system shown in the upper half of the drawings for dispensing concentrated flavor, simple or sugar syrup and acid, and a system for supplying both water and carbonated water for mixing with the liquids dispensed by the pumps in the upper half of the drawings. The several pumps for dispensing concentrated flavor, simple syrup and acid when needed are arranged in series along a mixing conduit 10 which is connected to the source of water and carbonated water. The water flowing through the mixing conduit 10 will pick up the more concentrated liquids and wash them into the drink receiving container.

In explaining the system of FIG. 1 we will proceed from the outlet spigot from which the drink is ejected into a container to the ultimate source of the water.

Arranged along the mixing conduit 10 in series with each other are a plurality of identical metering pumps 11a, 11b, 11c and 11d. There will be as many of these pumps as there are flavors to be dispensed excepting Coca-Cola flavor which is not commercially available in concentrated form and therefore cannot be dispensed in concentrated form. Concentrated flavoring is fed to each of these pumps from separate concentrate reservoirs 12a, 12b, 12c and 12d, one for each pump, which are connected to the pumps respectively through the conduits 13a, 13b, 13c and 13d. The detailed construction of the pumps is shown in FIG. 3 and will be explained hereinafter. It suffices at this time to say that upon actuation of any one pump handle 14, the selected pump meters a few drops of concentrated flavoring into the mixing conduit 10. For an eight ounce glass, the amount of concentrate metered will be approximately 15 drops.

Some of the flavors dispensed will require that acid be added to the drink and where acid is required, it will be introduced into the mixing line 10 through acid pumps 15a and 15b, again arranged in series along mixing conduit 10 and positioned upstream of the flavor concentrate pumps 11. These pumps receive acid from a common reservoir 16 which is connected to the pumps through conduit 17. While one acid pump might be employed, it is preferred to utilize two acid pumps and one or both of the pumps may be actuated at a time depending upon how much acid is desired for a particular drink. These acid pumps will be provided with the pump shown in FIG. 3 and may dispense approximately seven drops of acid each for eight ounce drinks.

All soft drinks require simple syrup and simple syrup is introduced into the conduit 10 at a point upstream of the acid pumps by a sugar pump 18. The sugar pump receives simple sugar syrup from a reservoir 19 connected to the pump by conduit 21. This pump 18 is shown in detail in FIG. 4 and its operation will be further explained below. The sugar pump is much larger than the other pumps as it dispenses a much larger volume of fluid. At this time it might be pointed out that the arrangement of the pumps along the mixing conduit 10 is not critical and they might be re-shuffled in any desired manner. They are preferably arranged in series as shown so that water flowing through the mixing conduit 10 will flush out the concentrated flavoring liquids.

As will more fully appear from the electrical diagram of FIG. 2, when one of the concentrate pumps 11 is actuated, the sugar pump is automatically actuated and one or more of the acid pumps is automatically actuated; thus, automatically introducing into the mixing conduit 10 the desired flavoring liquid. It is particularly pointed out that the electrical circuit is so arranged so that the actuation of any one of the flavor concentrate pumps actuates the sugar syrup pump and permits the simple sugar syrup to be stored in a separate container from the flavor concentrate and therefore concentrated flavors may be used instead of the flavored syrup heretofore used.

Arranged upstream of the sugar, acid and concentrate pumps so that they may govern whether plain water or carbonated water is introduced into the mixing line are valves A, B and C. Valve C controls the introduction of plain water into the mixting line and valves A and B control the introduction of carbonated water into the mixing line. Two valves A and B are used to control the carbonated water source as they provide a simple means of metering different volumes of carbonated water into the mixing line. Thus, as will appear in the discussion of the electrical circuit, the valves A and C are simultaneously opened for a period of approximately two and one-half seconds to provide sufficient plain water and carbonated water for an eight ounce drink. The valve B on the other hand is opened for five seconds to provide sufficient carbonated water alone to make an eight ounce drink. This arrangement permits drink mixing with water which is carbonated in different degrees as the mixing of plain water and carbonated water will reduce the degree of carbonation of the resulting mixture. To accomplish the above objectives, the valve C is interposed in the fresh water conduit 22 which empties into mixing conduit 10 and valves A and B are positioned in Y-legs 23 and 24 of line 25 coming from the carbonator indicated generally at 26. The Y-legs 23 and 24 each connect into the mixing conduit 10 downstream of the fresh water valve C.

The carbonator 26 automatically replenishes water and carbon dioxide in the carbonating tank 27 upon withdrawal of carbonated water to mix a drink. The vessel 27 is sealed to permit maintaining the carbonated water under pressure and is provided with a sight glass 28 for visual observation of the liquid level therein indicated at 29. The carbonating vessel 27 is connected to a source of fresh water represented by inlet line 31 through a conduit 32 and a series of valves A', B', D' and E arranged in parallel branches of conduit 32. As valve A controlling the admission of carbonated water to mixing line 10 is actuated, the valve A' is also actuated and introduces into the carbonator an amount of fresh water equal to the amount of carbonated water withdrawn through the valve A. Likewise, when valve B is actuated, valve B' admits fresh water to replenish the carbonated water withdrawn through valve B. The valve D' admits fresh water into the carbonator in an amount equal to the amount of carbonated water drawn off through valve D in conduit 33 for the making of Coca-Colas as will appear more fully hereinafter. Valve E is a manually operated valve for admitting fresh water to the carbonator when it is initially charged.

Carbon dioxide is introduced into the vessel 27 from a carbon dioxide source 34. The outlet of the carbon dioxide bottle 34 is controlled by regulator valve 35 interposed in conduit 36 which interconnects the carbon dioxide line and the inlet water line 32. The regulator valve will be set at a slightly higher pressure than the water pressure available from source 31 and as carbonated water is withdrawn from tank 27, fresh water will be introduced with a small additional amount of carbon dioxide to carbonate this water.

The carbonation level of the water within vessel 27 is maintained by a circulating system. An inlet spray 37 opens into the upper section of vessel 27 above the normal liquid level 29. An outlet 38 is provided in the bottom of the vessel. A conduit 39 having a pump 41 therein connects the inlet and outlet. Pump 41 withdraws carbonated water through outlet 38 and delivers it through conduit 39 to the spray outlet 37 thus providing for constant circulation of carbonated water and spraying the water into the carbon dioxide in the upper section of the tank 27 to maintain the level of carbonation of the water within the vessel 27.

In order to chill the water within tank 27, a refrigeration system indicated generally at 42 and having its cooling coil 43 within vessel 27 is provided. The refrigeration system 42 may be of any desired type and controlled in any desired manner to maintain the contents of vessel 27 at the desired temperature.

In order to cool the fresh water introduced through valve C into the mixing line, the fresh water line 22 is provided with a coil section 22a which is within vessel 27 so that both fresh water and carbonated water withdrawn for mixing drinks will be chilled. Line 22 connects with the fresh water source line 31.

To permit charging of the vessel 27 some means must be provided for venting air therefrom and this may be provided by a suitable vent valve 44 in the top of vessel 27.

Coca-Cola flavoring is not available in concentrate form, and therefore to permit the system to be used for mixing all types of soft drinks, a separate system is provided for handling Coca-Cola. As before mentioned, a line 33 for receiving carbonated water is controlled by the valve D. Line 33 extends to and passes through a Coca-Cola pump 44 which meters Coca-Cola syrup from reservoir 45 into the spigot 46. In preparing a Coca-Cola, the metering pump 44 is actuated and the control valve D is actuated to withdraw the desired amount of carbonated water, and the valve D' is actuated to replenish the carbonator with a like amount of fresh water. The carbonated water passing through pump 44 which is the pump of FIG. 4, will flush the Coca-Cola syrup from the pump and pass it along with the carbonated water into the container 47.

In placing the system in operation, the vent valve 44' is opened, the manual valve E opened, and the vessel filled to approximately the level shown, utilizing sight glass 28 to control the level. Valves E and 44' are then closed and the regulator valve 35 set to the desired pressure. Preferably, one of the concentrate pumps 11 is then actuated even though no concentrate, sugar or acid are present to fill the mixing line 10 with liquid. In this way, flavor concentrate will always be injected into a line that is filled with liquid and therefore none of the flavor concentrate will cling to the surface of the mixing conduit and be left in the conduit after a drink has been mixed. To insure that this liquid will remain in the line, the line is preferably caused to flow against gravity at least to a slight extent as suggested by the crook 10a in the outlet of the mixing line 10 at spigot 46. The upstream end of the line is closed and therefore the line will not drain. Also this line will be of relatively small diameter and for that reason would tend to maintain the liquid in the line even if not forced to flow against gravity.

The flavor concentrate, acid and sugar reservoirs as well as the Coca-Cola reservoirs may now be filled and the refrigeration system and pump 41 turned on. While the refrigeration system is cooling the liquid within reservoir 27, pump 41 will circulate the contents of the reservoir and bring the water up to the required level of carbonation.

Reference is now made to FIG. 3 in which the pump 11 is shown. The pump has a body provided by tubular member 47 having an internal bore 47a, and having a partition 48 adjacent its lower end. The partition 48 has a plurality of outlets 49 therein to provide for outward flow of fluid from within the tubular member 47.

To prevent back flow through the outlets 49 a spring loaded check valve member 51 cooperates with a seat 52 in the underside of partition 48. The check 51 has a guide stem 53 reciprocating in guideways 54 and 55 and is urged toward seated position by a compression spring 56.

It is preferred that liquid injected by the pump 11 be introduced directly into the mixing line 10 and for this purpose the lower end 47b of the tubular member 47 provides a part of the mixing line 10. The above may be provided by positioning a plug 57 in the end 47b of the tubular member 47 and leaving a space between the plug and partition 48 with the mixing conduit 10 including the space thus provided.

Fluid is introduced into the metering pump 11 through the inlet pipe 13 from one of the reservoirs 12 or 16. The upper end of cylindrical member 47 is closed by a plug 58. The inlet conduit 13 from one of the reservoirs may be tapped into the side wall of plug 58 and communicate with a bore 59 therein leading to the interior of the tubular member 47 to introduce liquid to be metered into the metering pump.

Fluid is metered through the pump by a piston 61 mounted for reciprocation within the bore of the tubular member 47 and between the inlet and outlet. The piston may be provided with a sliding seal with the bore 47a in any desired manner such as by O-ring 68 to prevent flow of fluid between the piston and cylinder wall as the piston is reciprocated. This piston is reciprocated by an actuator rod 62 which is slidably mounted in a central bore 63 in the top closure plugs 58. An O-ring seal 64 prevents loss of fluid between the actuating rod and the top plug 58.

The piston 61 is constructed so that on the metering stroke, it is in effect a solid member and ejects fluid positioned below the piston into the mixing line. It is further constructed so that on its return stroke, a valve opens to permit the fluid to be metered to be passed through the piston in sufficient volume to accumulate below the piston the desired amount of fluid to be metered the next time the piston is actuated. This preferred structure may be provided by one or more passageways 65 extending through the piston 61. A valve seat 66 surrounds the passageways 65 and a valve member 67 cooperates with seat 66 to permit flow through the piston 61 on the return stroke and prevent flow through the piston 61 on the metering stroke.

The valve member 67 is preferably secured to the actuating shaft 62 so that upon movement of shaft 62 toward the outlet ports 49, the valve member will seat and prevent flow through the bypass passageway 65. The shaft 62 is also preferably connected to piston 61 through a lost motion connection to permit the valve 67 to unseat before the return stroke of the actuator rod 62 is effective upon the piston 61. This may be provided by an extension 69 on the actuator stem 62 which extends beyond valve member 67 and through a central bore 71 in piston 61. The bore 71 is counterbored at 72 and a head 73 is provided on the rod extension 69. The head is spaced from the shoulder 74 between the bore 71 and counterbore 72 with the valve member seated so that when the actuator rod begins the return stroke, the valve 67 will unseat before the head 73 engages this shoulder 74 and returns the piston to its retracted position. The rod extension 69 slides in piston 61. Friction between piston and valve body resists movement of the piston. As the piston cannot move until the openings through it are closed on the discharge stroke, the valve will provide a positive metering device.

Referring now to FIG. 4, it will be noted that from the closure plug 58 to closure plug 57, the two pumps of FIG. 3 and FIG. 4 are identical with the exception that the upper end of closure plug 58a of FIG. 4 is not threaded as is the case in FIG. 3. These identical pumps are reciprocated in different manners depending upon whether they are wholly electrically operated, wholly manually operated or partially electrically and partially manually operated. Where manual operation in whole or in part is provided for, the plug 58 is provided with a male thread 75 to which a cover 76 may be secured to enclose the resilient return mechanism indicated generally at 77.

The resilient return mechanism 77 includes an actuator rod 78 having an annular flange 79 thereon. The rod 78 is secured to a threaded end portion 62a of actuator rod 62. Spring 81 is interposed between the upper surface of closure plug 58 and the undersurface of annular flange 79 and urges the flange and hence the actuator rod 62 toward retracted position. The threaded connection between the actuator rod 62 and rod 78 provides for adjustment of the throw of the piston 61 as the amount of make-up of this threaded connection determines the distance between piston 61 and the annular flange 79.

When the pump is to be manually actuated, as is preferred in the case of the flavor concentrate pumps 11, the rod 78 terminates in the actuator button 14 and depressing of the button 14 will move the piston 61 downwardly to eject fluid therebelow.

When the pump is to be manually returned, but operated by an electric motor on the metering stroke, the rod 78 is replaced by a solenoid core such as shown at 82 (FIG. 4), which extends into the solenoid 83 to provide an electric motor for actuating the piston 61.

When it is desired to operate the pump both on the metering stroke and on the return stroke by an electric motor, the core 82 extends into an additional solenoid 84 placed above the down solenoid 83 to provide a double-acting solenoid (FIG. 4). Thus, upon energizing solenoid 83, the piston is moved downwardly during the metering stroke and upon energizing of the up solenoid 84, the piston is withdrawn to its retracted position. Again the thread connection between the rod 62 and core 82 provides for adjustment of the throw of the piston. The stop for downward movement of the piston is provided by the piston abutting against the partition 48 in the lower end of the tubular member 47. The up stop is provided by the solenoid core moving into fully retracted position within the up solenoid 84.

From the above it is believed the action of the pump is apparent. Whether the pump is operated partially or wholly by mechanical or electrical means, the rod 62 is reciprocated within bore 63. In reciprocating from the fully extended to the retracted position, the valve 67 is first unseated and the piston 61 moved toward retracted position through the bore 47a which will be filled with the liquid to be metered. The pumps create a vacuum as piston 61 is moved downward to draw in liquid from the reservoirs. However, in a preferred form the reservoir feeding the pump will be positioned above the pump so that gravity flow will maintain the space above the piston 61 filled with liquid. As the actuator rod travels upwardly, fluid within bore 47a may pass through passageways 65 into the bore 47a below piston 61. Due to the frictional engagement between the piston and bore 47a the valve 67 will remain unseated after the valve has been withdrawn to fully retracted position and thus it will be insured that liquid to be metered will flow by gravity into the lower end of chamber provided by bore 47a. Upon actuation of the rod 62 toward the outlet ports 49, the valve 67 will first seat and then begin to move piston 61 downwardly. As the pressure of the liquid below the piston builds up, it will force the check valve 51 to open and piston 61 will eject the fluid below the piston into the lower portion 47a of the body where it will be picked up by water moving through the mixing tube 10.

When the pump of FIG. 3 is used as metering pump for concentrated flavor, an actuator rod 85 is preferably carried by rod 73 and energizes an electrical circuit to operate the remaining valves of the system as will appear in the explanation of the electrical circuit hereinbelow.

Referring now to FIG. 5 there is shown an alternate form of pump. While this pump may be used in the system, the pump of FIG. 3 and FIG. 4 is preferred. The pump of FIG. 5 is made up of a body 86 having a piston cylinder 87 therein. An inlet line 88 opens into the side wall of the cylinder and receives liquid to be metered from a reservoir by gravity flow. A ball check 89 is interposed in the conduit 88 immediately adjacent the cylindrical bore 87 and prevents back flow of liquid from the bore 87 upon downward movement of piston 90. The piston 90 is provided with a suitable sliding seal with the bore 87 as by O-ring 91. The vacuum set up by retracting piston 90 will overcome the force of spring 92 operating on ball check 89 so that when the piston 90 is retracted, the cylindrical bore 87 will fill with fluid to be metered.

The outlet 93 from the cylindrical bore 87 again leads directly into the metering conduit 10 and the outlet is provided with a ball check 94 to prevent back flow of fluid from the metering line 10 into the bore 87. The ball check 94 is held against its seat by a spring loaded plunger 95 urged upwardly by a spring 96.

In the operation of this form of pump, the ball check 89 unseats upon retraction of piston 90 to fill the bore 87 with fluid. Then, upon movement of piston 90 downwardly on its ejection stroke, the inlet ball check 89 seats and the outlet ball check 94 unseats permitting the liquid within the bore 87 to be ejected into the mixing conduit 10.

Reference is now made to FIG. 2 wherein a preferred electrical circuit is shown for operating the system of FIG. 1 and the pumps of FIGS. 3 and 4. It will be understood that these several pumps could be operated manually or by any desired electrical circuit, the one shown being the preferred form of circuit.

The several relays and pumps depicted in FIG. 2 are all in the positions which they assume when the drink mixer is not mixing a drink. At this time, there is an electrical holding circuit to hold the double-acting solenoid sugar pump and Coca-Cola pump in fully retracted position. The coil spring 81 (FIG. 3) retains the other pumps in fully retracted position. Tracing the circuit from the 110 volt alternating current source, it will be assumed that current is flowing from line 97 to line 98. Tracing first the circuits of the double-acting sugar pump solenoid, current flows from line 97 across line 99, thence through line 101, thence through lines 102 and 103, and the capacitors 104 and 105 across the lines 102 and 103 respectively, thence to line 106 and to the down solenoid 83. From the down solenoid 83 current flows through line 107 through line 108, thence through line 109, thence through line 111 to source line 98. It will be noted that the plunger 82 extends into coil 83 only a short distance and as the power of the down solenoid 83 is very small due to the series connected capacitors 104 and 105, there will be only a small force tending to pull the plunger 82 into the solenoid 83.

Current is also flowing from line 101 through line 112 and across the capacitor 113 therein, thence through line 114 to the up solenoid 84. From the up solenoid 84 current flows through line 115 into line 109 and from line 109 into line 111 and to the source line 98. It will be noted that the plunger 82 is fully home in the up solenoid 84 and therefore the pull exerted by the up solenoid is much greater than the pull exerted by the down solenoid and the solenoid 84 will act as a holding solenoid to retain the sugar pump piston in fully retracted position.

Upon actuation of any one of pumps 11, the member 85 actuates the microswitch 116 associated with the particular pump actuator. There is one of these microswitches for each flavor concentrate pump. When a microswitch 116 is closed, current from line 99 passes through the switch and through line 117 to a relay indicated generally at 118. The capacitor 119 prevents arcing of the relay. Current passes from relay 118 into the relay indicated generally at 121 where it closes the double contacts 122 and 123. Current then passes from relay 121 through line 124, switch 125 into line 107 from whence it returns to source line 98 through lines 108, 109 and 111.

Upon closing relay 121, current passes from line 99 through line 101 thence to line 126 and through the two relay switches 122 and 123 to line 106, bypassing the capacitors 104 and 105. From line 106 this current passes through the down solenoid coil 83 and thence to line 107, 108, 109 and 111 to source line 98. Inasmuch as the capacitors have been cut out of the circuit, the current passing through the down solenoid is now greater and the pull of the down solenoid is greater than the pull of the up solenoid. The solenoid plunger 82 is therefore moved downwardly to move the piston within the syrup pump downwardly and eject a measured quantity of syrup into the mixing line 10. As the plunger moves to its fully down position, the switch 125 is opened by a rod 127 carried by the solenoid plunger 82. This opens the circuit of relay 121 and the current through the down solenoid is again passed through the capacitors 104 and 105 and the pull of the down solenoid is greatly reduced.

As the solenoid plunger moves downwardly, the rod 127 permits a switch 128 to close. Upon this switch closing and the relay 121 opening, current is passed from line 99 through line 101, thence through line 126, through relay contact 123 to line 129, to relay 130, to close the relay 130. The current from the relay 130 passes through line 131, switch 128, line 115 and then through lines 109 and 111 to source line 98. Upon closing of relay 130, current from line 99 passes through line 101 to line 132 and through the relay to line 114, bypassing the capacitor 113, thence to the up solenoid 84. As the capacitor 113 is bypassed, the pull of the up solenoid is greater than the pull of the down solenoid and the plunger is raised to return the sugar pump piston to its retracted position. Continuing the tracing of the current flow from the solenoid 84, it passes through line 115, thence to line 109, and thence through line 111 to source 98. As the solenoid moves into its up position, the rod 127 opens switch 128 and the sugar pump circuit is again in the inoperative position.

It will be noted that the four flavor concentrate pumps 11 are arranged in banks of two with pumps 11a and 11b causing, by actuation of microswitch 116, current to flow from line 99 through the microswitch and lines 132 and 133 as the case may be into line 134. This contact is made as the sugar pump circuit previously explained is actuated. Current from line 134 passes to line 135 where it energizes the solenoid 83 of acid pump 15a to inject acid into the system. Current leaves the solenoid 83 through line 136 and returns to source 98. Current also passes from line 134 through relay 137 and line 135a to energize solenoid 83 of acid pump 15b to inject acid into the system. Upon breaking of the microswitch 116, the spring 81 returns the acid pump pistons to their retracted position.

The signal from line 134 also passes through line 138 to the relay 139 and to line 140. As the relay 139 is actuated, the current in line 138 passes through the relay to the line 141 of the timer circuit. The timer 142 is actuated through lines 143 and 144 from source lines 97 and 98. When the timer is actuated by a signal from line 141 it passess current through line 145, through the solenoid actuators C, A and A' through parallel lines 146, 147 and 148. Current passing through these solenoid actuators flows into a common line 149 and thence to the source line 98. The timer maintains the signal passing through the three solenoids for the desired period of time, for instance two and one-half seconds. By reference to FIG. 1, it will be recalled that valves C, A and A' introduce equal volumes of plain water and carbonated water into the mixing line 10 and replenish the carbonator with an amount of plain water equal to the amount of carbonated water withdrawn from the carbonator.

In some drinks, it is desired to use only a single shot of acid and these mixing circuits are depicted with the two flavor pumps 11c and 11d. Upon actuation of either pump 11c or 11d, the microswitches 116 provide for a signal to travel from line 99 through the microswitch actuated to lines 153 or 154 as the case may be and thence through line 155 through relay 139 to line 156 of the timer. A signal from line 156 energizes the timer for a longer period, say five seconds, and current from the timer passes through line 157 to solenoid valves B and B' through parallel lines 158 and 159 and thence to the return line 98. It will be recalled that valves B and B' control a carbonated water outlet from the carbonator and one of the plain water inlets to the carbonator to withdraw carbonated water and replenish the carbonator with a like amount of plain water.

Returning to the acid pumps, energizing of lines 153 or 154 causes a signal to pass through line 161 to relay 137 which closes and a signal from source line 97 passes through line 162, thence through the relay contacts to line 152 and then to line 135a to energize solenoid 83 of acid pump 15b. In this instance, the solenoid of acid pump 15a would not be energized and therefore only a single shot of acid would be introduced into the mixing line.

From the above it will be seen that by actuating a selected one of the flavor concentrate pumps, the desired amount of sugar, acid, carbonated or plain water may be introduced into the system. It will be understood that various similar arrangements might be made to mix greater or lesser amounts of acid with other combinations of water and carbonated water to obtain drinks carbonated to different degrees and having different amounts of acid.

Referring now to the Coca-Cola circuit, the Coca-Cola button 163 is at the upper left-hand corner of the drawing and actuates a Coca-Cola pump 44 which is identical with and which is controlled by a circuit wich is identical with the circuit for the sugar pump solenoids 83 and 84. As these two circuits are identical, no further explanation is believed necessary. The components of the Coca-Cola circuit are given the suffix "a" to distinguish from the simple syrup circuit.

At the lower right-hand side of the drawing, the carbonated water button 164 for Coca-Cola closes a circuit 165 to the timer which causes a signal to flow for five seconds through parallel lines 166 and 167 to open solenoid valves D and D' to provide carbonated water for Coca-Cola and to replenish the carbonater with a like amount of plain water. If desired, an automatic actuator could be provided on the Coca-Cola button 163 to operate the carbonated water button, but it is desired to leave them separately so that there will be available a carbonated water button to withdraw carbonated water for any desired purpose.

Also, there is provided a straight sugar button 168 which controls circuit 169 also passing through the relay 118. Thus, upon closing of sugar button 168, the circuit of the sugar pump 118 is closed and plain sugar is introduced into the mixing line without the necessity of introducing flavor concentrate. The button 168 makes it possible to increase the sugar content of any drink by first actuating the sugar button 168 and then actuating one of the flavor concentrate pumps which would again actuate the sugar pump and result in a double shot of sugar in a drink.

From the above, it will be seen that by actuation of any one of the flavor concentrate pumps 11, the sugar pump and one or more acid pumps as well as the pumps controlling flow of carbonated and fresh water are actuated to inject the desired ingredients into the mixing line 10 and deliver them to the spigot 46.

Referring to FIG. 6, there is shown a drink mixer in which simple syrup is drawn from a single container and injected into separate mixing lines by separate sugar pumps and in which acid is drawn from a single container and injected into separate mixing lines by separate pumps. In this form of mixer, as best seen at FIG. 7, a bank of an acid, sugar and concentrate pump are actuated by a single solenoid indicated generally at 171. This system might also be provided in a manner to dispense a large number of different flavored drinks as suggested by the spigot, but for brevity only the Coca-Cola dispenser and two of the flavor dispensers are shown. In this case, the drink is mixed with equal volumes of plain water and carbonated water from the carbonator and plain water source as shown in FIG. 1, but it will be understood that other banks of flavor pumps may be set up to mix drinks with full carbonated water from the carbonator as shown in FIG. 1.

Referring to the details of the FIG. 6 drink mixer, the mixing conduits 10 are again provided with carbonated water from conduit 25 and with plain water from conduit 22. Each of the banks of pumps indicated generally at 172 and 173 is provided with a separate pair of valves A and C to meter water and carbonated water. These valves are actuated by an electrical control mechanism as will appear more fully hereinafter.

Each flavor is in this case provided with a separate system drawing in carbonated and fresh water from single source lines 22 and 25, but using separate sugar, acid and concentrate pumps for each flavor. Each bank of pumps 172 and 173 draws sugar from a common source 174 and each bank of pumps draws acid from a common source 175. From the pump banks 172 and 173, the mixing lines 10 extend to the common spigot 176 through which the mixture is introduced into a receptacle. The pump indicated at 44 is provided for making Coca-Cola and only a single syrup pump is used which injects into line 33 the Coca-Cola syrup as in the case of the FIG. 1 form of drink mixer. Again, carbonated water is injected into line 33 through a valve D.

Referring now to FIG. 7 it will be seen that the acid pump 15, the concentrate pump 11 and the sugar pump 18 are all connected to a crosshead 177 which is reciprocated by the solenoid 171. Thus, the number of solenoids is reduced to one for each flavor to be mixed by the system, but the number of sugar and acid pumps is increased. In this case only a single acid pump is used for each flavor and variations in the amount of acid for different drinks is provided by adjusting the throw of acid pump 15 through the adjusting nuts 178 and 179 which connect the stem 62 of the acid pump to the crosshead 177. The flavor concentrate pump may be adjusted in like manner. The sugar pump is also provided with an adjustment for the throw of the pump. The crosshead is provided with an upstanding threaded sleeve 180 which threadedly receives the stem 62 of the sugar pump and a nut 181 locks against the bottom of the crosshead 177 to lock the adjustment as set.

The crosshead is operated by the double-acting solenoid through a pair of spaced rods 182 and 183 which extend from the crosshead 177 to an upper crosshead 184 carried by the plunger 185 of the double-acting solenoid 171.

Thus, with upward movement of the plunger 185 of the solenoid, the three pumps are raised to retracted position. Upon downward movement of the solenoid plunger the three pumps will simultaneously operate to eject fluid into the mixing conduit 10.

The solenoid 171 may be operated in any desired manner as may valves A, A' and C. There is shown in FIG. 7 a preferred form of circuit for operating all of these valves in response to a selector button indicated generally at 186. This form of the invention is particularly adapted for use in a coin vending machine and the selector button 186 may be provided with a conventional mechanism for energizing the circuit in response to insertion of a coin as indicated schematically at 187.

In operating the circuit illustrated, the selector button 186 would be set to actuate the desired bank of pumps 172, 173, etc., in FIG. 6, only one bank of which is shown in conjunction with FIG. 7. A similar circuit is provided for each pump. After the selector button has been positioned to contact the desired circuit, a coin inserted into the coin mechanism 187 will energize the machine. If the system is used in other than a coin vending machine, the mechanism 187 would not be used and the circuit would be energized by making the selection with selector 186.

When the circuit is energized, the timer 188 would be energized to introduce a signal through lines 189 and 190 to operate valves A, A' and C as in the case of the FIG. 1 form of dispenser. The opening of these valves would introduce equal parts of fresh water and carbonated water into the mixing line 10 and would replenish the carbonator 26 with plain water in an amount equal to an amount of carbonated water withdrawn through valve A.

The circuit would simultaneously reciprocate solenoid 171 to inject acid, syrup and flavor concentrate into the mixing line 10.

The relay indicated generally at 191 is a slow activating holding relay to prevent continuous activation of the solenoid in the event the button is held down. Prior to actuation of the switch 186, a signal from source line 192 passes through line 193, relay 191, line 194, capacitor 195, thence through line 196 to source line 197. The relay 191 is provided with a coil having a resistance great enough to prevent current in line 194 from actuating the relay indicated generally at 198. Also, the relationship of the coil 191 and capacitor 195 is such that so long as the capacitor 195 remains in the circuit, the relay 191 will remain closed.

As soon as the circuit is completed from the selector switch 186 to line 199, current flows through line 199 thence through the relay contact member 201, and thence through line 194 to relay 198. Current from relay 198 passes through line 202, switch 203 and thence returns through line 204 to source line 192. By cutting out the resistance of the coil of relay 191, sufficient current passes through relay 198 to activate this relay. Upon actuation of relay 198, which is a double relay, the capacitor 195 is bypassed and current flows direct from line 194 through contact 205 of relay 198 to line 196 and returns to source line 197. Thus, as soon as relay 198 is actuated, the current will be increased through the slow actuating relay 191 by bypassing of capacitor 195. The relay may then break the contact between line 199 and contact member 201 without effecting further action of the circuit which is energized through lines 196 and 204.

Relay 198 is also provided with a contact member 206 which when the relay is closed bypasses the capacitor 207. When this capacitor 207 is in the circuit, the double-acting solenoid is provided with a weak signal in the down solenoid 208 in the same manner as the FIG. 2 circuit. The up solenoid 209 is also provided with a weak signal due to the current being required to pass through capacitor 211 when relay 212 is not closed as was the case in the FIG. 2 circuit. The solenoid plunger 185 is home in the up solenoid 209 and therefore the up solenoid will act as a holding solenoid.

When the relay 198 is energized to bypass the capacitor 207 of the relay 198, signal from line 196 passes through line 213, contact 206 of relay 198 into line 214, and thence to down solenoid 208. From the down solenoid coil 208 the signal passes through line 204 to source line 192. Thus, when the capacitor 207 is bypassed the signal in coil 208 is increased and draws the plunger 185 down to move the pistons of pumps 11, 15 and 18 downwardly to eject acid, syrup, and concentrated flavoring. As the solenoid plunger 185 moves downwardly, arm 215 opens switch 203 and breaks the circuit through the solenoid 198. This permits the solenoid 198 to close and the circuits therethrough to again pass through the capacitors 195 and 207 so that the signal through the slow activating relay 191 and the down solenoid relay 198 is again very small.

As the rod 215 moves down, it permits switch 216 to close. When this occurs, signal from line 196 passes through line 213, the contact 206 of relay 198 into line 217. Signal flows from line 217 through the coil of relay 212 and closes this relay to bypass capacitor 211. From the coil of relay 212 signal flows through switch 216 to line 204 and thence returns to source 192. As the capacitor 211 is bypassed, signal from line 197 passes through line 196 to the relay 212 and through the relay 212 to line 218 and thence to up solenoid 209. Signal from solenoid 209 returns to source line 192 through line 204. As the capacitor 211 is not now in the circuit the pull of the up solenoid 209 is greatly increased and overcomes the weak pull of the down solenoid 208 to return the pistons of the several pumps 11, 15 and 18 to their fully retracted positions. As the plunger 185 retracts, the actuator bar 215 again opens switch 216 and the circuit returns to its inoperative position as shown.

It might be noted in passing that each of the capacitors in both of the circuits shown herein will act as spark arresters for the relays.

The drink mixer of FIG. 6 and FIG. 7 works generally in the same manner as the FIG. 1 mixer and utilizes the pump of FIG. 4. Of course, the size of these pumps will vary with the sugar pump being much larger than the acid and flavor concentrate pumps. Upon actuation of the selector button 186, the crosshead 177 will operate all three of these pumps to inject into the mixing line 10 the sugar, flavor concentrate and acid, and the valves A, A' and C will be open to flush the sugar, flavor concentrate and acid from the mixing line 10 into the spigot 176 along with the carbonated water.

From the above it will be seen that all of the objects of this invention have been accomplished. There has been provided a drink dispensing machine which is relatively small in size as compared with those presently available due to the fact that it utilizes a single source of sugar syrup and acid and thus drastically reduces the size of the reservoirs needed to be provided in this type of machine.

This drink dispenser permits the use of plain sugar syrup and concentrated flavoring from separate sources and thus the cost of the syrup and concentrated flavoring is much less than in the conventional flavored syrup machines presently used.

The arrangement is such that the mixing lines are always filled with liquid.

There has also been provided an improved valve for metering syrup, acid and concentrate and a carbonator for use with the system which is automatically filled with chilled water carbonated to substantially the same level at all times.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A metering pump comprising in combination a body having a cylindrical bore; end closure members disposed to close the ends of the bore; a partition near an end of the body, separating the bore into a metering chamber and a transverse flow passageway, said partition having an opening therethrough forming an outlet from said metering chamber into said flow passageway; a valve seat surrounding said opening on a side of the partition in the flow passageway; a valve closure member in the flow passageway movable to and from seated position on said valve seat; a spring centrally disposed in the flow passageway to press the valve closure member toward the valve seat; an inlet and an outlet in the flow passageway substantially opposite each other disposed to pass liquid through the flow passageway in flushing relationship with the spring and valve closure member; a piston reciprocably disposed in the metering chamber having a plurality of passageways therethrough; a sealing member disposed around the piston to seal around the piston and the wall of the bore; a valve seat on a side of the piston opposite to said partition surrounding said plurality of passageways through the piston; a piston rod in the metering chamber extending through an end closure member; a lost-motion connection between the piston and piston rod; a valve closure member in the metering chamber movable to and from seated position on said last-mentioned valve seat by reciprocating movement of the piston rod; an inlet to the metering chamber; an extension of the piston rod outside the metering chamber; and an actuating member adjustable upon said extension to control length of stroke of said piston rod.

2. The pump of claim 1 in which the piston rod extension and actuating member have interfitting threads adjustable to control length of stroke of the piston rod.

3. The pump of claim 1 wherein the partition is integral with the body and the sealing member is an O-ring.

4. The pump of claim 1 in which the actuating member is manually operable in a dispensing stroke and the spring is disposed to drive the actuating member in a following return stroke.

5. The pump of claim 1 in which the actuating member is a solenoid core and a solenoid coil is arranged to drive the actuating member in a dispensing stroke.

6. The pump of claim 1 in which the actuating member is a common core of two solenoid coils, one of said solenoid coils being arranged to drive the actuating member in a dispensing stroke and the other of said solenoid coils being arranged to drive the actuating member in a following return stroke.

References Cited in the file of this patent

UNITED STATES PATENTS

| Re. 4,050 | Putnam | June 28, 1870 |
| 1,039,336 | Tyler | Sept. 24, 1912 |
| 2,612,304 | Nissen | Sept. 30, 1952 |
| 2,699,718 | Wright | Jan. 18, 1955 |
| 2,730,958 | Nelson | Jan. 17, 1956 |
| 2,818,029 | Petzold | Dec. 31, 1957 |
| 2,931,313 | Hughes | Apr. 5, 1960 |